Oct. 26, 1965     O. J. DANKER     3,214,020
FUEL FILTRATION SYSTEM
Filed March 16, 1961     3 Sheets-Sheet 1
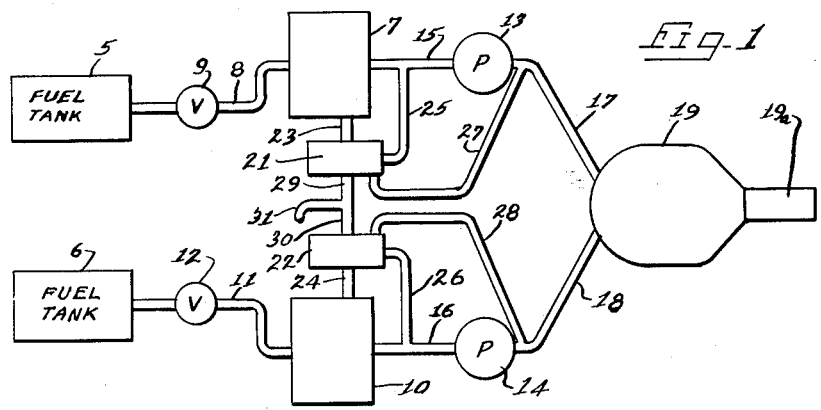
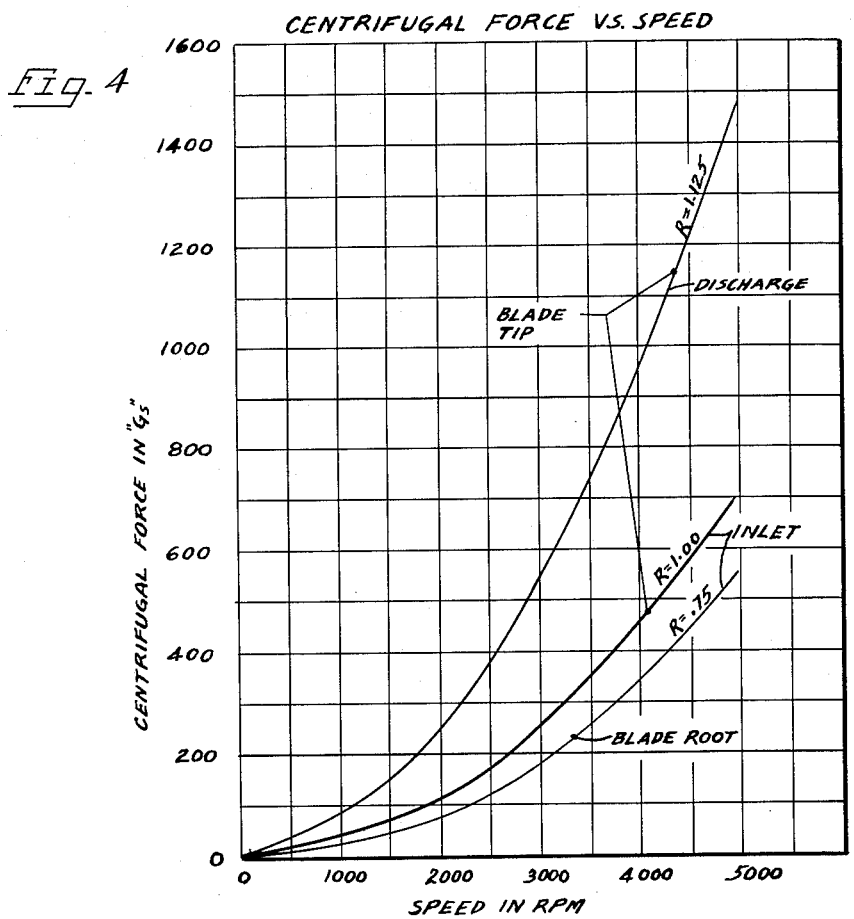
INVENTOR.
Otto J. Danker
BY
ATTORNEYS

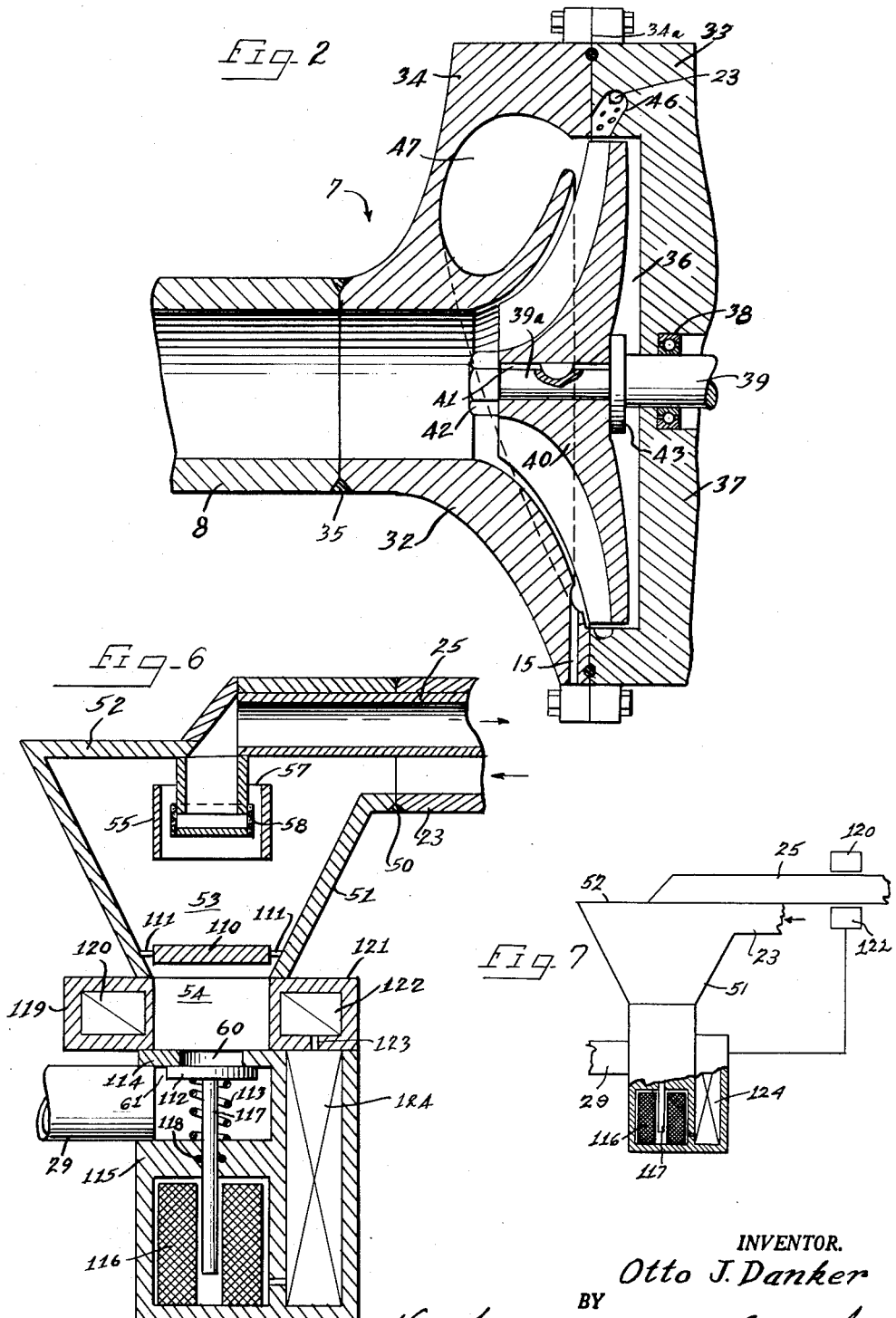

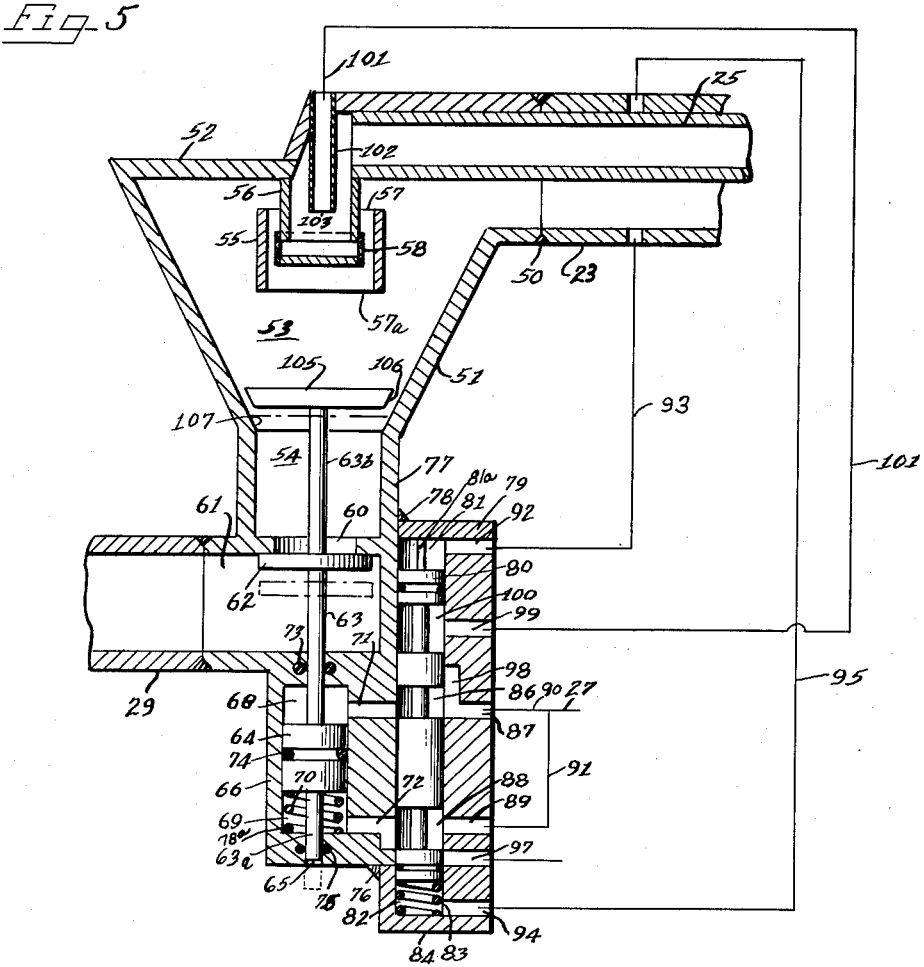

United States Patent Office

3,214,020
Patented Oct. 26, 1965

1

3,214,020
FUEL FILTRATION SYSTEM
Otto J. Danker, Cleveland Heights, Ohio, assignor to
TRW Inc., a corporation of Ohio
Filed Mar. 16, 1961, Ser. No. 96,183
4 Claims. (Cl. 210—108)

This invention relates to improved filtration means and is more particularly directed to a centrifugal filter pump system which may include the feature of automatic contaminant dump valve means.

Difficulty has been encountered in conventional fuel filtration systems employing static type barrier filters in that the filter would clog over time and thereby affect the flow rate of fuel. This problem is especially critical in fuel pump systems for aircraft engines, missiles, rockets and the like wherein the fuel is supplied under pressure to an engine or a reaction motor to thereby provide thrust to the airplane, rocket or missile. The fuel systems primarily used with main engine systems are those in which positive displacement pumps, normally gear pumps, are used.

Present specifications require the pump to run successfully on contaminated fuel. The primary objection to this contaminant fuel is that it will wear the close clearances and fine finishes of the gear pump until the pump cannot meet engine requirements.

In order to eliminate this contaminant with a barrier filter, an excessively large filter unit is required. This is undesirable from both a weight and envelope standpoint since both of these items are at a premium on present day aircraft engines. It will be appreciated therefore that the desired flow rate of the fuel components for such engines and reaction motors need controls so that the thrust characteristics and performance of the engine or reaction motor are maintained within acceptable limits for proper operation of the vehicle propelled by the engine or reaction motor.

In addition, means were not provided, as far as I am aware, for removing the build-up of solid particles on the barrier type screens. If a centrifuge filtration system were employed, the build-up of solid particles, over time would tend to affect operation of the fuel supply system. As far as I am aware, no dump valve means are presently employed with centrifugal type filter systems.

By employment of the present invention, I substantially eliminate the problems and difficulties of the prior art and provide a fuel filtration system including the feature of a radial flow impeller serving both as a boost pump and solid particles centrifuge. In addition the present invention contemplates employment of automatic dump valve means for discharging collected solid contaminants when a predetermined quantity of the contaminants has been collected.

It is therefore an object of the present invention to provide an improved fuel filtration system.

Another object of the present invention is to provide an improved fuel filtration system including the feature of a radial flow impeller serving both as a boost pump and solid particle contaminant centrifuge simultaneously.

Still another feature of the present invention is the provision of dump valve means automatically actuated to discharge collected solid particles in response to the quantity of solid particles collected in a chamber.

A further object of the present invention is to provide improved dump valve means for discharge of solid contaminants collected from a fuel flow system for discharge thereof in response to a pressure differential existing in a collection chamber at the inlet and outlets thereof.

A still further object of the present invention is to provide improved dump valve means for discharge of solid

2 contaminants from a collection chamber in response to an increase in the distribution of particles in the collection chamber.

These and other objects, features and advantages of the present invention will become more apparent from a careful consideration of the following detailed description when considered in conjunction with the accompanying drawing illustrating preferred embodiments of the present invention and wherein like reference numerals and characters refer to like and corresponding parts throughout the several views.

On the drawings:

FIGURE 1 is a generally schematic view of a fuel filtration system constructed in accordance with the present invention.

FIGURE 2 is a preferred form of radial impeller boost pump and contaminant centrifuge apparatus found useful in the practice of the present invention.

FIGURE 3 is a view in cross-section along lines III—III of FIGURE 2.

FIGURE 4 is a graph of typical impeller gravity force and shaft speed.

FIGURE 5 is a view in cross-section of one form of dump valve apparatus.

FIGURE 6 is a view in cross-section of dump valve apparatus operatively responsive to the quantity of collected solid particles for discharging a predetermined quantity of collected particles.

FIGURE 7 is an alternative embodiment of the apparatus of FIGURE 6.

On the drawing:

Briefly stated, the present invention contemplates a fuel filtration system employing a boost pump for supplying pressurized fuel to a primary pump including the feature of centrifuging solid particles from the fluid. The boost-centrifugal pump is of the radial impeller type and may be featured with an improved solid particle collection and dump apparatus which is responsive to the quantity of collected solid particles to dump a predetermined quantity of the solid particles.

While the present invention has a variety of applications, a contemplated use thereof is shown in FIGURE 1 in connection with an aircraft engine fuel supply system for propelling an aircraft, rocket, missile, satellite, nose cone, or other air or space borne vehicle. Its application to under water devices and auxiliary gas generation systems will be readily apparent to those skilled in the art.

As appears in FIGURE 1, a source of hydrocarbon fuel, may be contained in a conventional propellant tank 5. Similarly, a second or auxiliary supply of fuel may be confined in a second fuel tank 6. The fuel tank 5 communicates with boost-centrifuge pump means 7 constructed in accordance with the present invention through a conduit 8. A normally closed shut-off valve 9 may be provided which is operatively responsive for opening to a remote signal received, for example, from the auto-pilot system of the vehicle with which the engine fuel supply system is employed. Similarly, the tank 6 communicates with the inlet of boost-centrifuge means 10 constructed in accordance with the present invention through a conduit 11 which may contain a normally closed shut-off valve 12 operatively responsive for opening to the same source as the shut-off valve 9.

A pair of main or primary stage pumps 13 and 14, which may be of the positive displacement type, e.g., gear pumps, communicate through conduits 15 and 16 respectively with the outlet side of the boost-centrifuge pump means 7 and 10.

Pumps 13 and 14 are provided for the purpose of supplying the fuel components through conduits 17 and 18 to engine 19 which is provided with a conventional gas discharge nozzle 19a.

As appears in FIGURE 1, each of the boost-centrifuge means 7 and 10 may be provided with a separate solid particles collection and dump valve means 21 and 22 respectively and communicate therewith through conduits 23 and 24. A pair of filtered fuel component return lines 25 and 26 may also be provided to return the filtered fuel from the contaminant collection and dump valve means 21 and 22 to the respective conduits 15 and 16 preferably on the outlet side of the apparatus 7 and 10, as shown in FIGURE 1. Pressure lines 27 and 28 connecting the output side of the pumps 13 and 14 may also be provided which communicate with the collection chamber and dump valve means 21 and 22 respectively for purposes hereinafter more fully explained.

Each of the means 21 and 22 are provided with solid contaminant discharge conduits 29 and 30 which may be joined as at 31 to a conduit (not shown) for discharging the collected contaminants overboard from the vehicle with which the reaction motor system is employed. Under certain circumstances, it will be appreciated that a single collection chamber-dump valve means 21 or 22 may be employed for collecting contaminants from both boost-centrifuge pump means 7 and 10 with appropriate modification of the supply and return lines of the dump valve means. Similarly, a single collection chamber and dump valve means may be employed for only one of the fuel components, as desired, for example, for such applications as automobiles, monopropellant fuels and the like.

Thus, it will be appreciated that simple and effective reaction motor systems may be constructed in accordance with the present invention.

Referring to FIGURE 2, there is shown in cross-section a boost-solid particle centrifuge pump system advantageously employed in the practice of the present invention. Because the pump means 7 and 10 (FIGURE 1) are preferably identical in structure and operation, the following description will relate only to the pump means 7, it being appreciated, of course, that the description is applicable also to the pump means 10.

The pump means 7 include a two-piece housing 32 having a wall portion 33 connected as at 34a to an inlet portion 34. The inlet portion 34 is connected as at 35 to the inlet conduit 8 leading to the fuel tank 5. When assembled, the housing portions 33 and 34 define an impeller receiving chamber 36. Supported within the wall 37 of the housing portion 33 as in bearings 38 is the rotary shaft 39 carrying at one end thereof in the chamber 36 a radial impeller 40. The impeller 40 is provided with an axial bore 41 to receive a portion 39a of the shaft 39 and is secured thereto as by a nut 42 threaded at one end in the chamber 36 to the shaft portion 39a. A retaining ring 43 may be threaded to the shaft 39 for maintaining the impeller 40 in abutment against a nut 42. As the contaminated fuel enters the boost impeller 40 in chamber 36, the fuel accelerates to the raddial velocity of the drive shaft 39. This centrifugal force impressed on the individual solid particles in the fuel causes them to move in a spiral trajectory toward the impeller housing. As the fuel continues its course, the contaminant solid particles become concentrated at the impeller blade tips and may be discharged into an annular passage 46 formed in the housing portion 33 adjacent the impeller blade tips whereas the main flow of fuel, now substantially impurity free, is discharged into a volute passage 47 formed in the housing portion 34. The contaminant containing fuel discharges from the chamber 46 into the outlet conduit 23 connected to the contaminant collecter chamber and dump valve means 21.

The major portion of the fuel flows from the volute passage 47 into the conduit 15 connected preferably adjacent the inlet of the main pump 13.

It will be appreciated that in the system illustrated in FIGURE 1, the boost-contaminant centrifuge pump 7 may be operated as a booster pump to increase the fuel pressure and the rate of flow of the fuel from the fuel tank to the main pump 13. Conventional means may be employed to vary the speed of the drive shaft 39 which normally would be the same as the speed of the main pump 13.

Previous studies have indicated that contaminants, assumed at the following specific gravities, require a relatively short length and degree of rotation for separation. Normally employed fuel contaminants include the following solid material:

| | Specific gravity |
|---|---|
| Iron oxide | 5.10 |
| Silica sand | 2.10 |
| Linters—dry | 1.10 |
| Linters—fuel wetted | .93 |
| Fuel | .76 to .87 |

The curve in FIGURE 4 indicates the centrifugal forces at various speeds for a small representative 2⅓ inch diameter centrifugal impeller found useful in the practice of the present invention. It will be noted that the "G" loadings between the inlet, blade root and the discharge blade top varies almost at a ratio of 1 to 3.

For solid particle contaminants such as those listed above, this "G" loading is sufficient to assure separation of the solid particles from the main portion of the centrifuging fuel adjacent the blade tops of the impeller 40.

Referring to FIGURE 5, there is illustrated a preferred embodiment of an automatically actuated solid particles collection chamber and dump valve apparatus constructed in accordance with the principles of the invention.

Conduit 23 is connected as by welds 50 to a generally conically shaped housing 51 at a location adjacent the upper end 52 thereof defining the swirl chamber portion of a greater cross-sectional diameter. The contaminated fuel is fed to the swirl chamber tangentially in such a manner as to swirl the fuel in chamber 53. The solid particles contained in the fuel will be thrown outward due to the centrifugal force applied thereto in the swirl chamber and impinge on the wall of the chamber and flow downwardly into a collection chamber 54. Swirling of the fuel in the chamber 53 may be stabilized by a generally cylindrical solid baffle 55 which also prevents direct flow from 23 to 56 and which is secured to an inwardly extending conduit 56 as by a spider arrangement 57. The baffle is opened at its end 57a whereby the vortexing centrifuge fuel substantially free of solid contaminants may pass up through a screening member 58 connected to the conduit 56. The thus cleaned fuel may then pass through a conduit defined by the wall 52 of the swirl chamber and under the influence of the pump 13 pass through conduit 25 into the conduit 15 (FIGURE 1).

The collection chamber 54 is provided with an opening 60 which communicates with the dump valve outlet chamber 61 connected to the discharge conduit 29 for dumping the solid particles overboard from the vehicle with which the system is employed. Positioned in the dump chamber 61 and closing the outlet 60 of the solid particle collection chamber is a valve member 62 carried by a shaft 63 which is connected to a piston head 64. An extension 63a of the shaft 63 extends from the opposite end of the piston head 64 and is seated in a groove or guide 65 formed in a piston housing 66.

The piston head 64 separates the housing 67 into a pair of compartments 68 and 69. Bottomed on one end wall 78a of the chamber 69 is resilient means 70, such as a compression spring, which acts against the piston 64 thereby urging the valve member 62 to the normally closed position. Formed in the housing 66 are a pair of inlet passages 71 and 72 which communicate with the chambers 68 and 69 respectively for introducing a pressurizing medium thereto for purposes more fully hereinafter described. Appropriate seal means 73, 74 and 75 may be provided to assure a leakproof piston assembly.

Connected to the piston housing 66 as at 76 and to the collection chamber wall 77 as at 78 is a spool piston housing 79. The housing 79 is bored to receive a spool piston 80 which is sized for reciprocation in the chamber or of the housing 79. The spool 80 separates the chamber bore of the housing 79 into a pair of compartments 81 and 82. Resilient means such as spring 83 bottomed on the end wall 84 of the housing 79 act on the spool piston 80 to maintain the piston in the position shown in FIGURE 5. The spool piston is provided with an annular groove 86 communicating the passage 71 with a passage 87 formed in the spool housing 79. Similarly the spool piston 80 is annularly grooved as at 88 to communicate passage 72 and a passage 89 formed in the spool housing 79. A conduit 90 having a leg 91 communicates passages 87 and 89 with the main pump discharge pressure line 27 which, as aforesaid, is connected to the output side of the pump 13. Thus means are provided for applying equal pressure in compartments 68 and 69 to maintain the piston 64 in the position shown in FIGURE 5 when the spool piston 80 is in the position therein shown. A stop 81a limits movement of piston 80.

A passage 92 formed in the housing 79 communicates the compartment 81 through a conduit 93 with the inlet passage 23 of the contaminated fuel whereby pressure may be applied in chamber 81 which is representative of the pressure in the contaminated fuel inlet 23. Similarly, a passage 94 is formed in the housing 79 communicating the chamber 82 through a conduit 95 with the clean fuel outlet conduit 25 whereby the pressure of the clean fuel may be applied against the spool piston 80. Thus, when the contaminated fuel inlet pressure sensed in chamber 81 is in equilibrium with the clean fuel outlet pressure sensed in chamber 82, the spool piston 80 is maintained in the position shown in FIGURE 5.

When the concentration level of the solid particles in the collection chamber and swirl chamber exceed the level acceptable to the collection chamber, the screen 58 through which the clean fuel flows to conduit 25 will become covered with particles causing a pressure differential to exist in the swirl chamber between the contaminated fuel inlet and clean fuel outlet. The pressure supplied through line 95 to chamber 82 will therefore be lower than the pressure applied in chamber 81 through line 93 thereby tending to move the spool piston 80 downwardly blocking passage 72 and communicating passage 89 through spool recess 88 with a low pressure outlet passage 97 formed in the spool housing 79. The high pressure entering chamber 71 will then act against the piston 64 forcing the piston downwardly and moving the valve member 62 from contact with the bottom of the collection chamber thereby opening the outlet 60 of the collection chamber for discharge of a predetermined quantity of solid particles from the collection chamber. It will be observed that spool passage 86 is sized relative to inlet passage 87 in such a manner that communication therebetween remains when the spool piston 80 is moved downwardly in the above described manner.

The inlet passage 87 is provided with a branch leg 98 which, when the spool piston is forced downwardly by the pressure in chamber 81 communicates with a passage 99 formed in the spool housing 79 through an annular groove 100 formed in the piston spool 80. Passage 99 communicates through a conduit 101 with an extension 102 extending into the outlet 56. When passage 98 and 99 are communicated, the main pump high discharge pressure flows through conduits 101 and 102 and are discharged from the outlet 103 in impinging relation with the screen 58 thereby cleaning the screen from the accumulated solid particles. With the solid particles removed from chamber 54, the equilibrium swirl conditions are reestablished in the swirl chamber 53 and, with the screen 58 cleaned, the pressure in the clean fuel outlet 25 is again brought in equilibrium with the contaminated fuel inlet pressure in conduit 23 whereby the pressure in chamber 82 is increased and equilibrium pressure conditions once again established between chambers 81 and 82 whereby the piston spool 80 is returned to the position shown in FIGURE 5. Communication between passage leg 98 and passage 99 is blocked and thereby flow through conduit 101 terminated. Similarly, communication between passages 89 and 72 is reestablished while communication between passages 89 and 97 is blocked when the piston is returned to the equilibrium position shown in FIGURE 5. Thus, the pressure equilibrium between chamber 69 and 68 is reestablished and the piston 64 moved upwardly thereby returning the valve member 62 to contact with the bottom wall of the collection chamber closing outlet 60.

To assure that only a predetermined quantity of solid particles are dumped into chamber 61, shaft 63 may be provided with an extension 63b passing upwardly into the collection chamber and carrying at its end in the swirl chamber a valve head 105 shown tapered as at 106 in cross-section which is adapted to seat against the complementarily tapered shoulder 107 provided by the swirl chamber internal wall, as shown by the dotted lines, when the valve member 62 is moved from contact with the bottom wall of the collection chamber to the position indicated by the dotted lines. Thus, means are provided for preventing excessive flow of the solid contaminants into the collection chamber 54 when the discharge opening 60 is unrestricted.

An alternative embodiment of a solid particle collection chamber and dump valve means, similar to the hydraulically operated apparatus above described appears in FIGURE 6 wherein like reference numerals and letters refer to like and corresponding parts. The electronically operated apparatus for dumping solid particles appearing in FIGURE 6 includes the clean fuel outlet connected to the outlet conduit 25 and the contaminated fuel inlet connected to conduit 23 for tangentially introducing the solid particle containing fuel into the swirl chamber 53. The baffle means 55 are provided as may be the screening member 58. Positioned adjacent the bottom of the swirl chamber is a generally flat circular member 110 supported as by spiders 111 to the walls of the swirl chamber 53 for dampening the turbulent flow and centrifuge action of the fuel in the swirl chamber. The solid particles collect adjacent the walls of the swirl chamber and settle downwardly into the collection chamber 54 passing through the spaces defined by the arms of the spider 111. A valve member 112 is biased as by resilient means 113 against the bottom wall 114 of the collection chamber 54 to prevent passage of the solid particles through the outlet 60 of the collection chamber. The resilient means 113 are bottomed against a solenoid housing 115 constructed of suitable material. The housing 115 contains a solenoid member 116 indicated schematically. A shaft 117 carries the valve member 112 and passes through the solenoid housing 115. The shaft 117 is preferably constructed of a highly conductive material and is movable in response to energization of the solenoid 116 from contact with the bottom wall 114 of the collection chamber 54. Appropriate shaft seal means 118 are provided. Thus, means are provided for opening of the outlet chamber 60 to discharge a quantity of solid particles from the collection chamber into the dump chambers 61 for discharge therefrom into conduit 29.

The collection chamber 54 may be either cylindrical or rectangular, as desired. Apparatus for actuating operation of the solenoid 116 will now be described.

Adjacent one side of the collection chamber 54 may be provided a housing 119 for a sonic transmitting member 120 for transmitting a sonic beam, preferably an ultrasonic beam, across the collection chamber 54 in a direction transverse to the direction of flow of the solid particles from the swirl chamber into the collection chamber.

Depending upon the configuration of the collection chamber, the housing 119 may be semi-circular or rectilinear. Preferably the beam generated by the transmitting device 120 extends across the full cross sectional width of the collection chamber; however, the present invention contemplates beam patterns and widths of various shape and dimension.

Adjacent the side of the collection chamber opposite the ultrasonic transmitting device 120 is a housing 121 containing an ultrasonic receiving device 122 for receiving the beams transmitted from the transmitting device 120. The details of sonic transmitting and receiving devices, such as above discussed, are well known in the art, and will not therefore be described herein.

When the solid particles build up in the collection chamber 54 to a predetermined level, the receiving device registers the decrease in beam intensity or increase in particle quantity and produces a voltage output which trips a relay switch 123 which in turn energizes the solenoid 116 through energizing means 124 of conventional construction. The energized solenoid moves the valve shaft 117 downward from the position shown in FIGURE 6 thereby opening the collection chamber 54 to the dump chamber 61 through the outlet 60. When the solid particles discharge into the dump chamber 61, the quantity and density of the discharge particles in the collection chamber decreases and accordingly the intensity of the transmitted ultrasonic beam increases whereby the ultrasonic receiving device 122, registers the decrease in the level of solid particles below the ultrasonic beam path and deenergizes the solenoid. Upon deenergization of the solenoid 116, the resilient means 113 return the valve member 112 to contact with the bottom wall 114 of the collection chamber thereby closing the outlet 60.

In the embodiment shown in FIGURE 7, the sonic transmitting device 120 and receiving device 122 are positioned adjacent the outlet conduit 25. In this manner, an increase in the particle quantity in the fuel returning through conduit 25 is measured. An increase in the particle quantity caused by build up of contaminants in the collection chamber would actuate the device 124 which would in turn energize the solenoid 116 and cause movement of the valve 117 and flow through conduit 29 of the contaminants. In this embodiment, the filter member 58 would not be employed.

It will thus be appreciated that by employment of the present invention, simple and effective fuel filtration is provided wherein a boost-centrifuge is utilized and solid particles may be discharged automatically as a function of the quantity of collected particles.

Although various minor modifications might be suggested by those versed in the art, it is to be understood that I wish to embody within the scope of the patent warranted hereon all such embodiments as reasonably and properly come within the scope of my contribution to the art.

I claim as my invention:

1. An automatic dump valve apparatus comprising: a housing defining a centrifuge chamber having a tangential inlet for introducing a fluid containing discrete solid particles into the chamber for imparting centrifugal flow thereto and having an outlet for discharge of centrifuged fluid therefrom, means for filtering flow through said outlet, a collection chamber communicating with the centrifuge chamber for collecting solid particles from the centrifuge chamber and having an outlet, dump valve means including a valve element controlling the outlet of the collection chamber, a piston head connected to said valve element, a housing enclosing said piston head and being divided thereby into a pair of pressurizable compartments, resilient means in one of said compartments for maintaining the valve element in a first position closing the outlet of the collection chamber, first passage means communicating with said one of said compartments, second passage means communicating with the other one of said compartments, a control valve housing having a chamber and a pair of inlets for a pressurizable medium communicating with the first and second passage means, a control valve piston having at least three spaced annular recesses therein positioned in the control valve chamber for separating the chamber into at least a pair of opposed compartments, first conduit means communicating one of the control valve compartments with the inlet of the centrifuge chamber, second conduit means communicating the other control valve compartment with the centrifuge fluid outlet of the centrifuge chamber whereby equilibrium conditions in said control valve compartments will maintain the control valve piston in a first position with two of the control piston recesses in communication with said pressurizable compartments, means for introducing pressurizing medium into said pressurizable compartments while said control valve is in said first position, said control valve piston being movable to a second position in response to a predetermined differential pressure condition existing between the inlet and the centrifuge fluid outlet of the centrifuge chamber, said control valve piston being shaped such that in said second position it blocks communication between one of said pressurizable compartments and one of the control piston recesses to move said dump valve element and open the collection chamber to permit discharge of particles therefrom, a by-pass outlet communicating with said control valve, means for communicating said one of said compartments with the control valve bypass outlet when said control valve piston is in said second position for by-passing flow from the blocked compartment, and means for bypassing a portion of the pressurizing medium when the control valve is in the second position for cleaning said filtering means to thereby re-establish equilibrium pressure conditions in said inlet and centrifuged fluid outlet and to return said control valve piston to said first position.

2. The dump valve apparatus as defined in claim 1, wherein said centrifuge chamber is frusto-conically shaped.

3. The dump valve apparatus as defined in claim 1 comprising a cylindrical baffle in said centrifuge chamber having an opening coaxial with said outlet and encircling said filtering means.

4. The automatic dump valve apparatus as defined in claim 1 wherein said dump valve means includes a valve head disposed in said centrifuge chamber, said valve head and said valve element being so constructed and so arranged whereby said valve head allows fluid communication between said centrifuge chamber and said collection chamber when said dump valve element is in said first position.

References Cited by the Examiner

UNITED STATES PATENTS

| 2,295,097 | 9/42 | Waugh | 210—112 X |
| 2,648,433 | 8/53 | Wright et al. | 210—112 X |
| 2,720,313 | 10/55 | Pattison | 210—111 |
| 2,931,508 | 4/60 | Morris et al. | 210—512 |

REUBEN FRIEDMAN, *Primary Examiner.*
HERBERT L. MARTIN, *Examiner.*